United States Patent [19]

Malpass, Jr.

[11] Patent Number: 4,487,901
[45] Date of Patent: Dec. 11, 1984

[54] POLYMERIZATION OF BETA-PINENE

[75] Inventor: Gerald D. Malpass, Jr., New Castle, Del.

[73] Assignee: Hercules Incorporated, Wilmington, Del.

[21] Appl. No.: 596,487

[22] Filed: Apr. 4, 1984

[51] Int. Cl.$^3$ ................................................ C08F 4/52
[52] U.S. Cl. .................................... 526/185; 526/186; 526/189; 526/280; 526/281
[58] Field of Search ............... 526/185, 186, 189, 280, 526/281

[56] References Cited

U.S. PATENT DOCUMENTS

| | | | |
|---|---|---|---|
| 2,932,631 | 4/1960 | Rummelsburg | 526/185 |
| 2,935,542 | 5/1960 | Minckler, Jr. et al. | 526/185 |
| 3,467,632 | 9/1969 | Davis | 526/281 |
| 3,816,381 | 6/1974 | Phillips | 526/281 |
| 4,038,474 | 7/1977 | Kudo et al. | 526/185 |
| 4,039,733 | 8/1977 | Kudo et al. | 526/185 |

Primary Examiner—Joseph L. Schofer
Assistant Examiner—J. M. Reddick
Attorney, Agent, or Firm—Joanne L. Horn

[57] ABSTRACT

Disclosed is a process for polymerizing beta-pinene to a substantially colorless, hard beta-pinene resin, and to the beta-pinene resin thus produced.

6 Claims, No Drawings

POLYMERIZATION OF BETA-PINENE

This invention relates to the polymerization of betapinene and to the essentially water-white, high softening point, hard beta-pinene resin thus produced.

It is known to polymerize beta-pinene to a hard betapinene resin by contacting beta-pinene with a catalytic amount of certain metal halides or alkyl metal halides. For example, U.S. Pat. No. 2,932,631 desctibes the polymerization of a mixture of alpha-pinene and beta-pinene with an organoaluminum chloride/Lewis acid catalyst having the formula $RAlCl_2$ where R is a hydrocarbon radical. However, the halide content of these halide-containing catalysts, and other halide-containing catalysts, such as $AlCl_3$, is so high and generally must be used in such quantities that a significant amount of halide, such as chlorine, is introduced into the process and halide contamination of the resin product results. Active metal halide catalysts, such as $RAlCl_2$ and aluminum trichloride ($AlCl_3$) also readily hydrolyze during the aqueous work-up of the resultant polymerization reaction mixture, thereby releasing corrosive acids, such as hydrochloric acid. A further drawback to the prior art catalysts is that the beta-pinene resins produced are typically light yellow to dark yellow in color, corresponding to from Gardner 2 to Gardner 5, or even darker in color. Resins which are darker than Gardner 5 in color are generally subjected to decolorization treatments to obtain resins having Gardner values in the 2 to 5 range.

The present invention tends to avoid the drawbacks of the prior art catalysts by sequentially contacting the beta-pinene monomer with a catalytic amount of (1) a halide-free Lewis-acid catalyst comprising a organoaluminum compound in an inert solvent, which catalyst is hydrolyzed and activated by the addition of about 0.5 mole to about 1.0 mole of water per mole of organoaluminum compound, and (2) then adding an alkyl halide.

The catalyst of this invention is formed by the partial hydrolysis of organoaluminum compound of the general formula $AlR_3$, wherein R is hydrogen, oxyhydrocarbon or hydrocarbon radicals or mixtures thereof. The hydrocarbon radical may be normal and branched chain alkyl, cycloalkyl, aryl, aralkyl radical having 1 to 10 carbon atoms. Suitable alkyl radicals include methyl, ethyl, propyl, isopropyl, butyl, isobutyl, pentyl, neopentyl, hexyl, and isohexyl, octyl, decyl and isoprenyl. Typical cycloalkyl radicals include cyclohexyl. Suitable aryl radicals include phenyl and suitable aralkyl radicals include tolyl. Ethoxy is a suitable oxyhydrocarbon radical. The partially hydrolyzed organoaluminum compound is then combined with a sufficient amount of an alkyl halide of the general formula R'X, wherein R' is H or a hydrocarbon radical and X is a halide radical, to form an active catalyst for the polymerization of beta-pinene. Typically the hydrocarbon radical R' is hydrogen, tert-butyl, benzyl, and allyl. Suitable halides include chloride, bromide and iodide.

The controlled hydrolysis of the organoaluminum compound by the addition of a specific amount of water is essential to obtain polymerization activity, since the organoaluminum compounds themselves are relatively weak Lewis acids which exhibit no polymerization activity even in the presence of appropriate cocatalysts.

The use of controlled hydrolysis of organoaluminum compounds to form stronger Lewis acids and their use in the polymerization of aldehydes and cyclic ethers is known. Furthermore, it is also known that the activity of the catalysts is highly dependent on the amount of water added, and that different monomers require different amounts of added water to attain maximum polymerization activity.

The polymerization reaction of the present invention is carried out in an inert atmosphere, and in an inert aromatic hydrocarbon solvent, i.e. an aromatic hydrocarbon solvent that is inert to the reaction and reaction products, such as toluene. Any solvent typically used to carry out cationic polymerizations in which the organoaluminum compounds are stable can be used. The organoaluminum compound is added to the sealed polymerization vessel containing the polymerization solvent, and the temperature of the solution is lowered to 0° C. Good stirring of the organoaluminum compound solution is maintained while the specified amount of water is added directly to the solution over a period of from about 20 to about 30 minutes, or at a rate sufficient to keep the reaction temperature from rising above 2° C. After the addition of the water is complete, stirring is continued at 0° C. for an additional 40 to 50 minutes. After the water has been added, the solution is warmed to ambient temperature (about 23° C.). The beta-pinene monomer is then added to the polymerization vessel, and, while maintaining good stirring, the alkyl halide cocatalyst is added at a rate such that the reaction temperature remains in the range of from about 20° C. to about 70° C., preferably from about 20° C. to about 50° C., throughout the addition.

The polymerization reaction mixture is then inactivated by quenching with an equal volume of water while maintaining good stirring. Stirring is continued for about five (5) minutes to allow complete inactivation of catalyst. Once stirring has been discontinued and the layers are allowed to separate, the reaction mixture is water washed and the aqueous layer and the insoluble products are discarded. The water wash is repeated again. The pH of the water washes are usually 6 to 7. The organic phase is then subjected to steam distillation using super heated steam at about 240° C. under an inert atmosphere by passing nitrogen or other inert gas through the distillation apparatus. The distillation temperature is not allowed to rise above 250° C.

The need to use neutralizing agents such as aqueous alkali in the reaction mixture workup is eliminated since no inorganic halide is present. Moreover, the aqueous workup of the polymerization reaction mixture does not result in the release of corrosive acids since metal halides are not used.

The solvent and monomer are dried prior to their use in polymerization reaction so that neither contain more than 5 to 10 parts per million (ppm) of water. Any method commonly used for drying such materials for polymerization reactions may be used, for example, activated silica gel or molecular sieves.

The alkyl halide cocatalyst can be tertiary butyl chloride, benzyl chloride, allylchloride or allyl bromide. Tertiary butyl chloride and benzyl chloride are the preferred cocatalysts since both give good yields of water-white or colorless resins and both are readily available. Anhydrous HCl can also be used as the cocatalyst, or any halide that ionizes in a Friedel-Crafts type reaction to generate a reactive cationic species.

Typically, equimolar quantities of the organoaluminum compound, water, and alkyl halide are used.

Preferably the organoaluminum compound is triethylaluminum or triisobutylaluminum. Triethylaluminum is the most preferred organoaluminum compound.

The amount of organoaluminum compound used can be from about 1% to about 4% by weight, based on the beta-pinene monomer, preferably from about 2% to about 4%.

Preferably, the amount of water added is 0.75 moles of water per 1.0 mole of organoaluminum compound.

Polymerization times are dependent upon the rate of addition of the alkyl halide cocatalyst, but usually 2 to 4 hours are sufficient for the addition of cocatalyst and reaction completion.

The source of the beta-pinene monomer generally used in carrying out this invention is a commericial mixture of terpenes typically containing about 75% beta-pinene and 8% alpha-pinene, with the balance consisting of other less reactive terpenes. The residual 25% composed of alpha-pinene and other terpene compounds is not readily polymerized by a cationic polymerization mechanism. Hence, the residual 25% remains largely unaffected by the addition of the alkyl halide cocatalyst.

To further illustrate this invention, various illustrative examples are set forth below.

All parts and percentages used in this specification and in the claims are by weight unless otherwise indicated.

EXAMPLES 1–6

In Examples 1 to 6 various embodiments of the beta-pinene resin of this invention. The details of various polymerization runs and the properties of the beta-pinene resin produced are set forth in Table I.

TABLE I

| | Examples | | | | | |
|---|---|---|---|---|---|---|
| | 1 | 2 | 3 | 4 | 5 | 6 |
| AlEt$_3$, mmoles | 36 | 18 | 18 | 18 | 18 | 18 |
| Water, mmoles | 36 | 18 | 18 | 18 | 18 | 13 |
| Cocatalyst, mmoles | | | | | | |
| t-butyl chloride | 55 | 21 | — | — | — | 18 |
| benzyl chloride | — | — | — | 13 | — | — |
| allyl bromide | — | — | — | — | 14 | — |
| anhydrous HCl | — | — | 16 | — | — | — |
| Beta-pinene monomer (75% beta-pinene), g. | 102 | 99.4 | 108 | 99.6 | 101 | 99.9 |
| Solvent, ml.$^{(a)}$ | 300 | 225 | 300 | 270 | 300 | 300 |
| Polymerization temp. range, °C. | 20–70 | 15–30 | 22–30 | 25–40 | 20–40 | 22–50 |
| Cocatalyst addition time, min. | 60 | 450 | 330 | 270 | 106 | 150 |
| Product, g. | 82.6 | 77.5 | 31.3 | 76.0 | 85.9 | 76.0 |
| Yield hard beta-pinene resin, %$^{(b)}$ | 81 | 78 | 29 | 76 | 85 | 76 |
| Ring & Ball, s. pt. °C.$^{(c)}$ | 118 | 119 | 107 | 103 | 122 | 115 |
| Gardner color$^{(d)}$ | 1 | −1 | 1 | 1 | 3$^{(e)}$ | 1 |

$^{(a)}$The solvent is a mixture of isomeric benzenes consisting largely of meta-xylene (26%), ortho-xylene (7%), 1,2,4-trimethyl-benzene (15%), para-ethyltoluene (10%), n-propylybenzene (7%), ortho-ethyltoluene (6%), metadiethylbenzene (6%), and cumene (3–4%).
$^{(b)}$Yield based on total monomer mixture.
$^{(c)}$ASTM method E28.
$^{(d)}$ASTM method D1544.
$^{(e)}$Resin initially colorless, but yellowed with age.

All of the hard beta-pinene resins of Examples 1 to 6 are initially colorless and remain colorless on aging for about four (4) months at room temperature (about 23° C.), except for the resin of Example 5 which is prepared with allyl bromide as the cocatalyst.

Hence, the process of this invention provides new and novel water-white, hard beta-pinene resins having a high Ring and Ball softenting point. These resins are useful in the manufacture of all types of adhesives, sealants and coatings as well as any other applications where light color resins are useful.

Features, advantages and other specific embodiments of this invention will become readily apparent to those exercising ordinary skill in the art after reading the foregoing disclosures. In this regard, while specific embodiments of this invention have been described in considerable detail, variations and modifications of these embodiments can be effected without departing from the spirit and scope of the invention as disclosed and claimed.

What I claim is:

1. A process for preparing an essentially water-white, hard beta-pinene resin comprising
   (a) hydrolyzing and activating a catalytic amount of organoaluminum compound of the formula AlR$_3$, wherein R is hydrogen, oxyhydrocarbon or hydrocarbon radicals or mixtures thereof, in an inert solvent by the addition of about 0.5 mole to about 1.0 mole of water per mole of the organoaluminum compound in the solvent;
   (b) adding a beta-pinene monomer to the hydrolyzed and activated organoaluminum compound in the solvent;
   (c) adding an alkyl halide of the general formula R'X, wherein R' is H or hydrocarbon radical and X is a halide radical at a temperature from about 20° C. to about 70° C. over a period of time sufficient to complete the addition of the alkyl halide and to form a reaction mixture containing the polymerized beta-pinene;
   (d) quenching the reaction mixture with water so that the mixture separates into at least an aqueous phase and an organic phase;
   (e) water-washing the reaction mixture;
   (f) recovering the organic phase; and,
   (g) recovering the resin by distilling off the solvent.

2. The process of claim 1 wherein R of (a) is selected from the group consisting of normal and branched chain alkyl, cycloalkyl, aryl, aralkyl or alkoxy and R' of (c) is selected from the group consisting of hydrogen, tert-butyl, benzyl, and allyl.

3. The process of claim 1 wherein (a) is selected from the group consisting of triethylaluminum and triisobutyl-aluminum.

4. The process of claim 1 wherein (c) is selected from the group consisting of tertiary butyl chloride, benzyl chloride, allyl chloride, and allyl bromide.

5. The process of claim 1 wherein (a) is present in an amount from about 1% to about 4%, by weight of (b).

6. The process of claim 1 wherein the water added in (a) ranges from 0.5 to about 1.0 mole per mole of the organoaluminum compound.

* * * * *